M. T. SELS.
HEN'S NEST.
APPLICATION FILED MAR. 30, 1915.
1,167,786.
Patented Jan. 11, 1916.
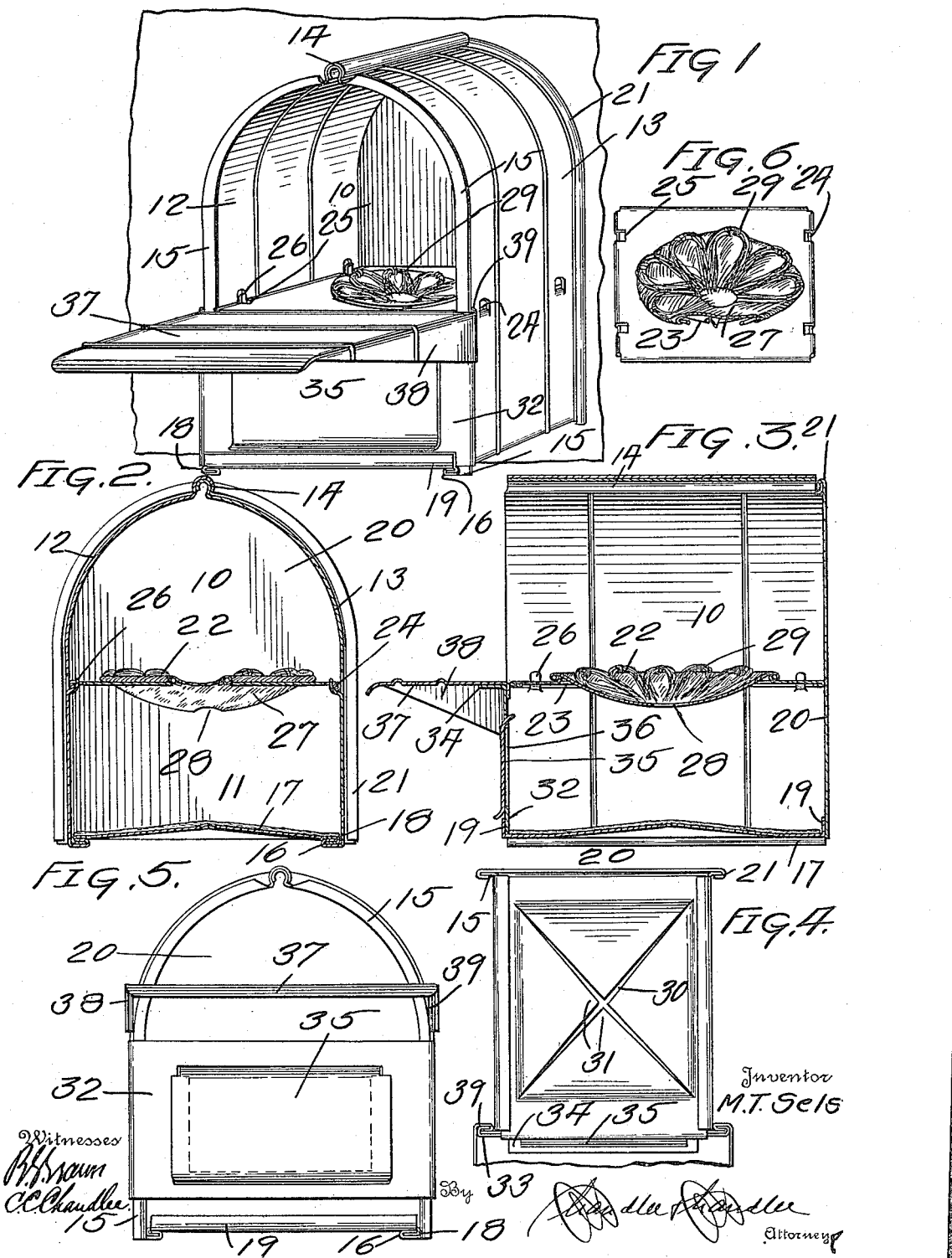

UNITED STATES PATENT OFFICE.

MARTINUS T. SELS, OF KNOXVILLE, IOWA.

HEN'S NEST.

1,167,786.  Specification of Letters Patent.  Patented Jan. 11, 1916.

Application filed March 30, 1915. Serial No. 18,149.

*To all whom it may concern:*

Be it known that I, MARTINUS T. SELS, a citizen of the United States, residing at Knoxville, in the county of Marion, State of Iowa, have invented certain new and useful Improvements in Hens' Nests; and I do hereby declare the following to be a full, clear, and exact description of the invention, such as will enable others skilled in the art to which it appertains to make and use the same.

This invention relates to nest boxes for poultry and more particularly to an improvement on my previous application filed Jan. 13, 1915, Ser. No. 2027.

An object of the invention resides in the provision of a nest box of knock-down type, in which the parts are so constructed and arranged as to be conveniently disassembled, and as readily set up for use.

A still further object is to provide a nest box, the collapsible nature of which will facilitate a thorough cleansing and disinfection of the parts.

With the above and other objects of similar nature in view, the invention consists in the construction, combination and arrangement of parts, set forth in and falling within the scope of the appended claims.

In the drawing:—Figure 1 is a perspective view of a nest box constructed in accordance with the invention. Fig. 2 is a vertical transverse sectional view therethrough. Fig. 3 is a vertical longitudinal section. Fig. 4 is a bottom plan view of the box. Fig. 5 is a front elevation partially disassembled, and Fig. 6 is a perspective view of the removable nest bottom.

Referring now more particularly to the drawing, the box comprises essentially a nesting compartment 10 and an egg compartment 11, the latter being adapted to receive the egg when laid and being conveniently accessible when it is desired to gather same without disturbing the hen upon the nest.

In constructing the nest, there is utilized two separable sections 12 and 13 oppositely bowed to provide the top and sides of the box and having the upper end edges rolled as at 14 and disposed in interfitting relation. The side edges of these sections are formed with outwardly directed flanges 15, and the lower or free edges thereof are bent inwardly and returned in spaced relation to provide suitable guideways 16 extending longitudinally of the box.

The bottom of the box is shown at 17 and comprises preferably a metal plate having its side edges 18 bent inwardly therebeneath for interlocking engagement within the guideways 16, the end portions 19 being directed upwardly at right angles and providing suitable stops as will presently be apparent. To close the back of the box a slide plate 20 is provided, having guides 21 formed in the edges thereof for slidably receiving the rear flanges 14 of the separable sections.

Arranged within the box thus formed and dividing same into the nesting and egg compartments above referred to, is a nest bottom 22, said bottom consisting of a rectangular plate, centrally apertured as at 23 and having rolled in the marginal edges thereof a wire 24, the plate being notched as at 25 adjacent its ends and the wire bridging said notches detachably engaging upturned hooks 26 stamped inwardly from the sides of the box.

Closing the aperture 23 in the plate is a flexible webbing 27 preferably of canvas, having formed therein an elongated slit 28, the eggs when laid passing through this slit and dropping within the compartment 11 provided for the purpose.

To lend the appearance of a nest to the bottom 22, and thus attract the hens, flexible loops 29 of hemp strands or like material are sewed to the webbing 27, the free ends of the loops extending over and covering the slit 28.

In order to prevent breaking of an egg when dropping from the nesting to the egg compartment, the bottom plate 17 is formed with a pair of crossed diagonal slits 30 resulting in resilient fingers 31, these fingers being bent upwardly to a point beneath the slit 28 and yielding readily when engaged by the egg. To close the front of the egg compartment a plate 32 is provided having formed in its ends guides 33 slidably receiving the forward flanges 14 of the separable sections, the bottom edge of said closure plate resting behind the stop 19 in the bottom 17 while its upper edge is directed forwardly as indicated at 34 in the plane of the nest bottom 22. Access to the egg compartment is obtained by means of a hinged door 35 which swings outwardly to expose an opening 36 provided in the closure plate. A platform 37 is also provided to assist the hens in entering or leaving the nest and has its rear edge bent downwardly to extend behind the closure plate 32, there being integral brace members 38 at the ends of the platform provided with guides 39 detachably interlocked with the plate 32 and forward flanges 14 and resting upon the forwardly directed portion 34 of the plate.

It is obvious from the foregoing that a nest box has been provided, the parts of which may be readily assembled or disassembled for cleaning and disinfection, and disposed in small compass for storage or transportation.

What is claimed, is:—

A collapsible nest box comprising a bottom member provided at its front edge with an upturned flange, side members detachably interlocked with the bottom member, a nest bottom removably supported between the side members and dividing the box vertically into compartments, a front member for the lower of said compartments detachably interlocked with the side members and resting upon the bottom member between its flange and the side members, said front member having its upper edge outwardly directed, and a platform disposed in the plane of the nest bottom and supported upon the outwardly directed portion of the front member, said platform having its sides angularly directed and detachably interlocked with the front and side members and its rear edge bent downwardly and engaged behind said front member.

In testimony whereof, I affix my signature, in the presence of two witnesses.

MARTINUS T. SELS.

Witnesses:
LEONARD WEYERS,
J. A. VANDERWAL.

Copies of this patent may be obtained for five cents each, by addressing the "Commissioner of Patents, Washington, D. C."